2 Sheets--Sheet 1.

T. C. SEBRING.
Seed and Fertilizer-Sowers.

No. 153,787. Patented Aug. 4, 1874.

WITNESSES.
F. H. Schott
C. L. Evert

INVENTOR
Thompson C. Sebring.
Alexander Mason
By
Attorneys.

T. C. SEBRING.
Seed and Fertilizer-Sowers.
No. 153,787. Patented Aug. 4, 1874.
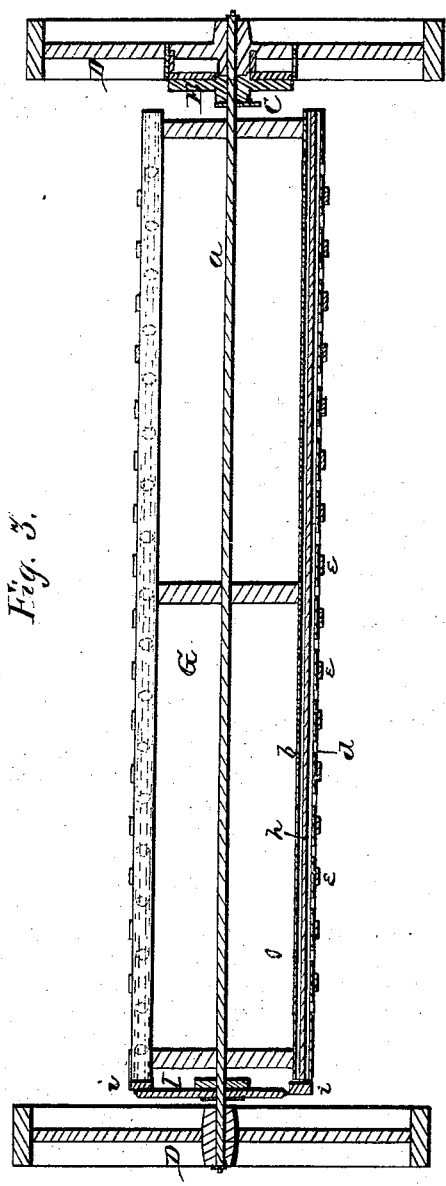
WITNESSES.
INVENTOR
Thompson C. Sebring
Alexander Mason
By
Attorneys.

UNITED STATES PATENT OFFICE.

THOMPSON C. SEBRING, OF MILFORD, ASSIGNOR TO HENRY A. KIPP, OF HIGHLAND, AND THOMPSON C. SEBRING, OF MILFORD, MICHIGAN.

IMPROVEMENT IN SEED AND FERTILIZER SOWERS.

Specification forming part of Letters Patent No. 153,787, dated August 4, 1874; application filed April 16, 1874.

*To all whom it may concern:*

Be it known that I, THOMPSON C. SEBRING, of Milford, in the county of Oakland and in the State of Michigan, have invented certain new and useful Improvements in Seed and Fertilizer Sowers; and do hereby declare that the following is a full, clear, and exact description thereof, reference being had to the accompanying drawings, and to the letters of reference marked thereon, making a part of this specification.

The nature of my invention consists in the construction and arrangement of a seed and fertilizer sower, as will be hereinafter more fully set forth.

In order to enable others skilled in the art to which my invention appertains to make and use the same, I will now proceed to describe its construction and operation, referring to the annexed drawings, in which—

Figure 1:
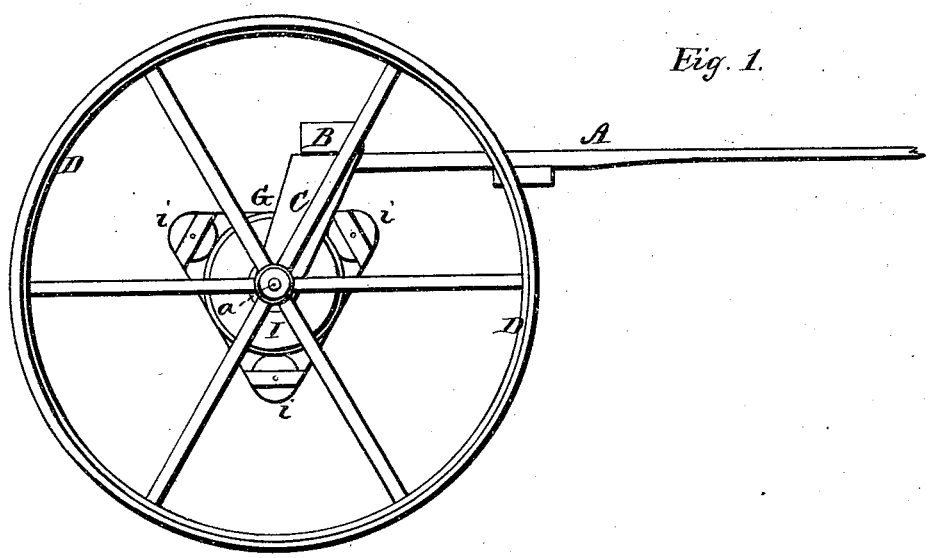
Figure 2:
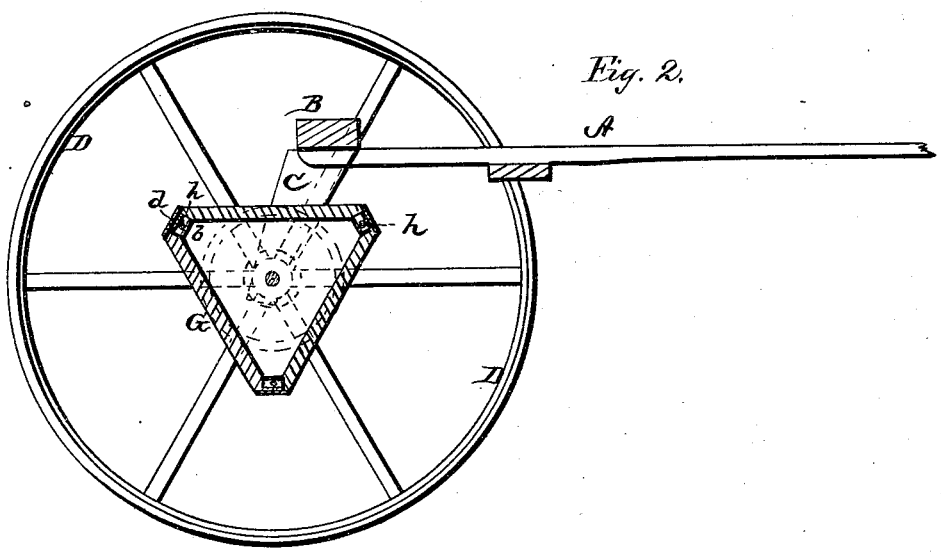

Figure 1 is a side elevation of my seed-sower. Fig. 2 is a transverse section through the seed-box, and Fig. 3 is a longitudinal section of the same.

A A represent the shafts, secured at their rear ends to a cross-bar, B, from each end of which depends a hanger, C, and through the lower ends of said hangers passes the shaft or axle $a$, having a driving-wheel, D, on each end. Both of these wheels are loose upon the axle, and one of them is connected with the axle by a suitable ratchet device, E, in such a manner that in going forward the wheel will turn the axle, but in going backward the wheel will turn on the axle without revolving the same. Upon the axle $a$, between the hangers C C, is firmly secured the seed-box G, the axle passing longitudinally through the same. The seed-box G is made in triangular form, as shown, the corners being cut off longitudinally, forming passages extending the entire length of the box. Each of these corners is provided with two longitudinal perforated slides, $b$ and $d$, the inner one, $b$, of which moves in grooves made in the sides of the box, while the outer one, $d$, moves in and is held by straps $e\ e$, attached to the outside of the box. Between the slides $b\ d$ is placed a cord, $h$, extending the entire length of the box, one end of said cord being loose and the other end attached to the journal of a pulley or wheel, $i$, placed on the outside, at one end of the box, and having its bearings in suitable arms or straps attached to the box. The pulleys or wheels $i\ i$ are in contact with a wheel, I, secured to the hanger C at that end of the box, and through the hub of which wheel the shaft $a$ passes. When the seed-box G is revolved by the forward motion of the machine the wheels $i\ i$ will be revolved by friction with the wheel I, and the cords $h\ h$ thereby are revolved continually, so as to prevent clogging between the slides and allow the seed to pass out through the outer slide $d$. Either side of the seed-box G may be provided with a door for the admission of the seed therein. By moving the outer slide the amount of seed sown may be easily regulated.

The seed-box, with its attachments, may be hung on the axle-tree of a hay-rake and connect the box-shaft $a$ with said axle-tree by means of suitable gear-wheels.

The same machine may be used for distributing fertilizers.

Having thus fully described my invention, what I claim as new, and desire to secure by Letters Patent, is—

1. The triangular box G, provided in each corner with the slides $b\ d$ and revolving cord $h$, substantially as and for the purposes herein set forth.

2. The combination, with the revolving triangular box G, having slides $b\ d$ in each corner, of the cords $h\ h$, wheels $i\ i$, and large stationary wheel I, all substantially as and for the purposes herein set forth.

In testimony that I claim the foregoing I have hereunto set my hand this 19th day of March, 1874.

THOMPSON C. SEBRING.

Witnesses:
DANIEL MORRISON,
JOHN PERKINS.